United States Patent [19]
Norin et al.

[11] Patent Number: 5,794,253
[45] Date of Patent: Aug. 11, 1998

[54] TIME BASED EXPIRATION OF DATA OBJECTS IN A STORE AND FORWARD REPLICATION ENTERPRISE

[75] Inventors: Scott Norin, Newcastle; Max L. Benson, Redmond, both of Wash.

[73] Assignee: Microsoft Corporation, Redmond, Wash.

[21] Appl. No.: 679,053

[22] Filed: Jul. 12, 1996

[51] Int. Cl.$^6$ .................................................. G06F 17/30
[52] U.S. Cl. ........................... 707/203; 707/10; 707/201
[58] Field of Search ............................ 707/10, 204, 201, 707/203

[56] References Cited

U.S. PATENT DOCUMENTS 5,649,195  7/1997  Scott et al. .......................... 707/201

OTHER PUBLICATIONS

Yavin, D. "Replication's Fast Track," *BYTE*, Aug. 1995, pp. 88a–88d, 90.

*Primary Examiner*—Thomas G. Black
*Assistant Examiner*—Charles L. Rones
*Attorney, Agent, or Firm*—Workman, Nydegger & Seeley

[57] ABSTRACT

Systems and methods of time based data expiration in a replication environment are presented. The systems and methods of the present invention allow different age limits to be set on each individual server in a network. A network can therefore be configured with some servers having no age limit and other servers having a wide range of differing age limits. Systems and methods for handling mixed data sets that include some data objects which are allowed to expire and some data objects which do not expire are also presented. In all cases, the time based data expiration systems and methods are designed to insure proper operation of the replication process and any associated data recovery process. Specifically, expired data will not be recovered via any data recovery mechanism and servers will not attempt to recover missing data from a server that has expired that data.

29 Claims, 5 Drawing Sheets

TIME BASED EXPIRATION OF DATA OBJECTS IN A STORE AND FORWARD REPLICATION ENTERPRISE

BACKGROUND OF THE INVENTION

1. The Field of the Invention

The present invention relates to systems and methods for replication of data, that is, broadcasting changes (e.g., creation of new data, modification of existing data or deletion of existing data) made locally at one server to a specified list of other remote or locally connected servers. More specifically, the present invention relates to systems and methods for time based expiration of a data in an environment where data is replicated among various servers in a replication enterprise.

2. The Relevant Technology

Today, business and technology trends are changing the way we use computers and information. The personal computer or PC has become the standard business information tool as prices have decreased and computing power has increased. In record numbers, businesses are re-engineering their organizational structure and processes to become faster and more competitive, in addition to being better able to use the wealth of information resources available today. Never before has there been so much information so readily available nor such high expectations for how much the individual will be able to accomplish by utilizing this information. The result is that people today need access to information everywhere, anytime. In June 1994, Microsoft announced a new product designed to meet these needs called Microsoft® Exchange.

The main concept behind Microsoft® Exchange is to provide a product that integrates E-mail, scheduling, electronic forms, document sharing, and other applications such as customer tracking to make it altogether easier to turn information into a business advantage. The result is that users can access, organize, and exchange a world of information, wherever they happen to be in the world—whether from the office, the home, or while traveling on the road. In essence, a main barrier to PC-based communication, namely, accessibility and sharing by multiple parties of up-to-the-minute information, has now been significantly reduced.

With the increased accessibility and sharing of information between multiple users, it is now more common than ever for such multiple users to simultaneously or in tandem work on shared data set objects, as, for example, word processing documents, spreadsheets, electronic forms, E-mail messages, graphics images, or a host of other such data objects. With such shared use of data objects among multiple users of a computer network, there arises the need for each user to keep all other users of the same data object or the same set of data objects apprised of the changes that are made locally by that user. This gives rise to a process called replication of data, that is, transferring changes (e.g., creation of new data, modification of existing data or deletion of existing data) made locally at one server to a specified list of other remote or locally connected servers.

When data is replicated at various locations in a computer network (sometimes called a "replication enterprise"), it is generally preferred that the copies of the data that are replicated among various servers in the enterprise be identical. In other words, it is generally preferred that all users which access a particular data object see an identical version of that data object, regardless of which copy of the data object they access. Replication processes are therefore designed to synchronize all copies of a particular data object and prevent data loss from occurring. In certain situations, however, such a paradigm does not provide the flexibility needed.

Certain types of data loses its importance over time. For example, imagine a public database containing newswire articles. The database is updated frequently throughout the day with current news from a data source, such as the AP newswire. Such a database would likely have several key characteristics. The first characteristic is that, due to the volume of news information available, the database may grow very large in a relatively short period of time. In addition, as the news articles age, they typically lose their importance. In such a situation it may be desirable to implement the concept of time based expiration.

Time based expiration provides an automated mechanism to delete information which is of little or no interest. Time based expiration can automatically delete information that is older than a specified time limit. Returning to the example of the newswire article database, an administrator of such a database can set an age limit for the information in the database, such as 24 hours. Each news article is stamped with the current time when it is created in the database. When that news article is more than 24 hours old, it will automatically be deleted. Such a situation provides two benefits. First, it limits the size of the database to newswire articles which are less than 24 hours old. Second, the older, less useful news articles are automatically deleted, just as you would throw away an old newspaper.

Time based expiration of data works well on a single system. When, however, the database is replicated across an enterprise at multiple locations, problems can arise. For example, in the above example it was presumed that old newswire articles were of little interest. While this statement may be true for many individuals, in certain situations old newswire articles are very important. Many libraries or other institutions routinely archive and save old newswire articles for use by individuals doing research. Thus, it may be desirable that certain systems in a replication enterprise delete old data while other systems in the enterprise retain old data.

Trying to implement such a scheme with current technology can create many problems. On the one hand there is a desire that all copies of the database are synchronized to create identical copies. Many of the replication processes currently available today are designed to achieve this one goal. Thus, when the various copies of the database are not the same, the replication process will take steps to synchronize the copies. If older articles were deleted from one copy of a database but retained in another, many replication processes will attempt to synchronize the two copies either by deleting old articles from one copy or adding old articles back into the other copy. This presents a situation where an administrator must choose between deleting old data on all systems or keeping old data on all systems. There is currently no way to set up a replication enterprise that allows different systems in the enterprise to have different time based expiration limits. It would, therefore, be an advancement in the art to provide a system and method that allows a replication process to tailor time based expiration of data individually for each system in the enterprise. This capability would allow an administrator to set one time limit on one system, another time limit on another system, and perhaps no time limit on yet a third system.

In many replication environments an entire group of data objects are replicated as a unit. In the example given above, a database of newswire articles was replicated as a unit across an enterprise. Furthermore, it was presumed that all data in the database would be allowed to expire after a certain time limit. In reality, however, such a database may comprise a wide variety of objects. For example, the database of newswire articles may also contain forms or templates to display the newswire articles in a number of standard formats. Perhaps various formats are used for various purposes. Perhaps one format is used to display a newswire article on the screen while another format is used to display a newswire article that is inserted into a document. A database may, therefore, comprise not only data which becomes less important as it ages but also data that does not lose its importance as it ages. In such a mixed database it would be desirable to expire and remove the data which loses its importance as it ages, but yet retain the data that does not lose its importance as it ages. Presently, however, it is not possible to replicate a collection of objects and only apply time based data expiration to certain objects in the collection. It would, therefore, represent an advancement in the art to provide the ability to expire and remove certain objects in a collection replicated across an enterprise while retaining other objects in the collection.

SUMMARY AND OBJECTS OF THE INVENTION

1. Glossary of Terms

In order to assist in more easily understanding the terminology used in the following detailed description and summary of the invention, the following definitions for key terms are provided:

Asynchronous store and forward replication: A process of replicating data throughout a network or enterprise by broadcasting locally made changes (e.g., creation of new data, modification of existing data, or deletion of existing data) to a specified list of servers (called replica nodes) which contain copies of the data. Communications in store and forward replication are one-way and there is no acknowledgment of receipt of messages containing the changes.

Backfill: A discovery based data recovery process by which changes held by other servers (called replica nodes) but not held locally are recovered so that the copy of the data set (called a replica) held locally is the same as replicas held by other replica nodes.

Backfill set: A list of changes held by other replica nodes but not held locally.

Change number: A unique identifying code used to identify a particular change made to a particular data object by a particular replica node.

Change range: A range of changes, identified by a minimum and maximum change number. The change range is inclusive of the minimum and maximum change number.

Change set: The set of change ranges that defines the changes available for a given replica of a data set on a given replica node. The change set contains changes made by the local replica node and changes to the data set received from other replica nodes through the replication process.

Data set: A set of objects which can be replicated. In one sense a data set can be thought of as a container with various data set properties which holds or stores data objects, much like a folder contains documents. A populated data set includes the data objects, while an unpopulated data set does not have any associated data objects and only refers to the data set properties.

Data set list: A list of the data set properties for the data sets being replicated across the enterprise. In one sense, a data set list can be thought of as a container which holds or stores data sets (as defined by their data set properties) in much the same way that a data set is a container that stores data objects. Thus, a data set is a container that holds data objects while a data set list is a container that holds data sets (the set of data sets).

Data set properties: A set of information that describes a data set. Data set properties can include such information as a name and/or ID value and a list of servers which have the contents of a data set (the replica list).

Enterprise: The set of servers (or replica nodes) comprising the replication environment.

Replica: A local copy of a particular data set replicated on one or more replica nodes throughout the network.

Replica list: A list of all replica nodes on the network containing a replica of a particular data set.

Replica node: A server or other location on the network where a copy of a data set (called a replica) resides.

Replica object: An object or group of objects which can be replicated.

Replica object distribution list: A general term for the distribution list for a replica object. For example, if the replica object is a data object, the replica object distribution list is a replica list.

Site: A plurality of replica nodes in which each node is relatively similar in terms of cost to access data, as compared to the cost between sites. Cost is representative of factors such as the monetary cost to obtain data, the speed of obtaining data, and the reliability of obtaining data.

BRIEF SUMMARY AND OBJECTS OF THE INVENTION

The foregoing problems in the prior state of the art have been successfully overcome by the present invention, which is directed to a system and method for time based expiration of data in a replication enterprise that allows the time limit for data expiration to be set individually on each system. The current system and method can be used with virtually any replication process. The preferred replication process, however, is an asynchronous store and forward replication process.

In a store and forward replication process, each server keeps track of locally made changes to a particular copy of a data set (sometimes referred to as a "replica") which contains one or more data objects. Each server periodically broadcasts the new locally made changes (since the last replication broadcast) to all other servers with a copy of the same data set. The group of other servers also having a copy of the data set is kept on a "replica list." The changes are preferably broadcast in the form of updated copies of the changed data objects. This allows each server to update the local replica as changes are received by replacing the older data objects with the newer data objects. In the same broadcast, the server also includes the "change set" available for the local copy of the data set on the server. A "change set" is basically a list of changes that have been made to the local copy of the data set and includes not only those changes made locally by the server but also those changes received from other servers on the replica set.

A store and forward replication process utilizes existing networking hardware and/or control software as a transport system to deliver one-way, unacknowledged messages between servers within a replication enterprise, much like E-mail messages are delivered between users of computer systems. Because the messages sent between systems to replicate data are one-way, unacknowledged messages, the possibility exists that one or more of the changes contained in the replication package may be lost. This leads to a process to recover lost or missing data from a local copy of the data set. This process, sometimes referred to as "backfilling," is accomplished by keeping track of the changes that have been made locally or have been received through the replication process. These changes are stored in a local change set. (As previously described, the local change set is broadcast with replication messages.) By comparing the local change set with the change sets received from other servers through replication messages, a server can discover what changes are missing from its local copy of the data set and which servers can provide those changes. Once a server discovers changes missing from its local copy of the data set, the server can request the missing changes from one or more other servers that have the desired changes.

The present invention provides a system and method for removing data older than a given time limit from the local copy of a data set, yet preventing any data recovery mechanism from recovering the changes which are removed and preventing other systems from asking for the expired data. The basic expiration process proceeds by periodically checking the local copy of the data set for data objects which are older than a designated age limit. Data objects which are older than a designated age limit are said to have "expired." Expired data objects are removed from the local copy of the data set. This removal is not replicated to other servers.

In order to prevent the local data recovery mechanism from backfilling the data objects that have expired and been removed from the local copy of the data set, when the local change set is compared to change sets received from other replica nodes, the changes corresponding to expired data objects are retained in the local change set. The local data recovery mechanism will thus consider the expired changes to be available locally even though the corresponding expired data objects have been removed from the data set. Since the expired changes are considered to be available locally, the data recovery mechanism will not request them from other replica nodes.

In order to prevent other replica nodes from requesting changes corresponding to expired data objects, a list of expired changes is stored locally. Before the local change set is broadcast to other servers in the enterprise, the expired changes are removed from the change set. This "external change set," therefore, does not contain any changes corresponding to data objects which have expired and been removed from the local copy of the data set. Other servers receiving this change set will understand that the data objects corresponding to expired changes are not available on this server, and they will not ask for these changes through any data recovery mechanism employed to backfill missing changes.

In order to provide a mechanism to handle "mixed data sets" where some data objects are allowed to expire and some data objects never expire, data objects in the data set are marked as either expirable or non-expirable. A change set for "expirable" data objects is kept separately from a change set for "non-expirable" data objects. Periodically the expirable data objects are checked for any expired objects. Messages broadcast during the replication process contain two change sets, one change set corresponding to the expirable data objects and one change set corresponding to the non-expirable data objects.

The change set for the expirable data objects is handled as described above with a list of expired changes being stored locally and being removed from the expirable data set before broadcasting to the other servers. The change set for the non-expirable data objects simply includes all those changes made to the non-expirable data objects. No changes are ever removed from this change set because no changes for this change set expire. By keeping and sending two separate change sets, one corresponding to non-expirable data objects and one corresponding to expirable data objects, the data recovery mechanism utilized in the replication process can request expirable and non-expirable changes separately. This creates a highly flexible replication process where time based expiration can be tailored individually for each server. Furthermore, mixed data sets having both expirable and non-expirable data objects can be handled.

Accordingly, it is a primary object of this invention to provide systems and methods for time based data expiration that allow each system in the enterprise to have a different expiration time limit.

Another primary object of this present invention is to provide time based data expiration for data sets that contain both expirable data objects and non-expirable data objects.

Another important object of the present invention is to provide systems and methods for time based data expiration that will work with data recovery processes that retrieve missing data from other systems in the enterprise.

Additional objects and advantages of the invention will be set forth in the description which follows, and in part will be obvious from the description, or may be learned by practice of the invention. The objects and advantages of the invention may be realized and obtained by means of the instruments and combinations particularly pointed out in the appended claims. These and other objects and features of the present invention will become more fully apparent from the following description and the appended claims, or may be learned by practice of the invention as set forth hereinafter.

BRIEF DESCRIPTION OF THE DRAWINGS

In order that the manner in which the above-recited and other advantages and objects of the invention are obtained, a more particular description of the invention briefly described above will be rendered by reference to specific embodiments thereof which are illustrated in the appended drawings. Understanding that these drawings depict only typical embodiments of the invention and are not, therefore, to be considered to be limiting of its scope, the invention will be described and explained with additional specificity and detail through the use of the accompanying drawings in which.

DETAILED DESCRIPTION OF THE PREFERRED EMBODIMENTS

Figure 1:
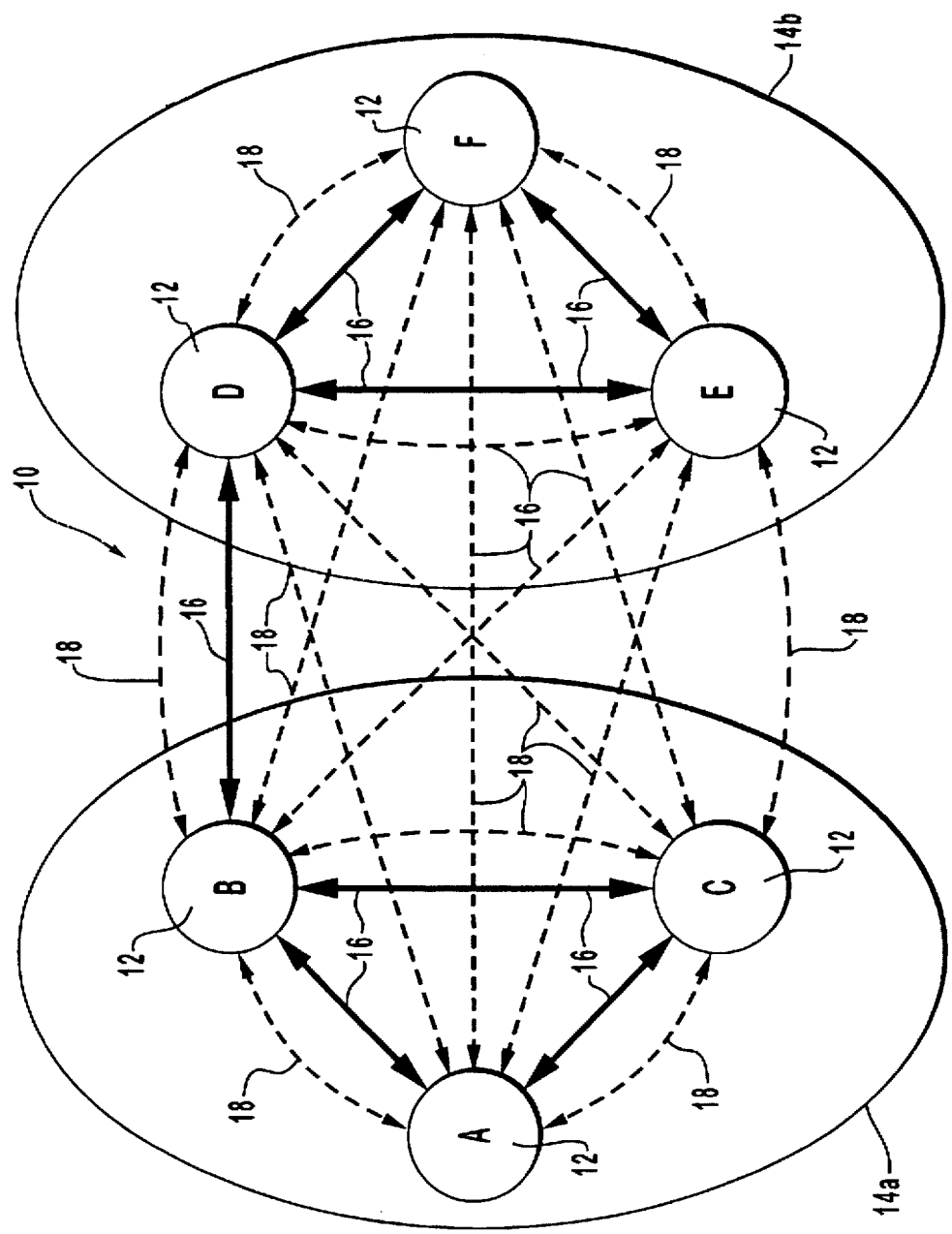
FIG. 1 is a representation of the topology of an example replication enterprise.

The following description of the present invention is presented by using flow diagrams to describe either the structure or the processing of presently preferred embodiments to implement the systems and methods of the present invention. Using the diagrams in this manner to present the invention should not be construed as limiting of its scope. The present invention contemplates both methods and systems for time based data expiration in a replication enterprise. The presently preferred embodiment for implementing a system of time based data expiration comprises a general purpose computer. The currently disclosed system, however, can also be used with any special purpose computer or other hardware system and all should be included within its scope.

Embodiments within the scope of the present invention also include articles of manufacture comprising programs storage means having encoded therein program code means. Such program storage means can be any available media which can be accessed by a general purpose or special purpose computer. By way of example, and not limitation, such program storage means can comprise RAM, ROM, EEPROM, CD-ROM or other optical disk storage, magnetic disk storage or other magnetic storage devices, or any other medium which can be used to store the desired program code means and which can be accessed by a general purpose or special purpose computer. Combinations of the above should also be included in the scope of program storage means.

Program code means comprises, for example, executable instructions and data which cause a general purpose computer or special purpose computer to perform a certain function or a group of functions.

1. Summary of Store and Forward Replication

The system and method for time based data expiration of the present invention as disclosed herein can be utilized with almost any type of replication process. However, the systems and methods of the present invention do require some sort of replication process. The presently preferred type of replication process is a store and forward replication process.

Although store and forward replication does not form a specific part of the present invention, an understanding of the basics of store and forward replication is helpful in understanding the details of the present invention. For a detailed discussion of store and forward replication, see copending U.S. patent application Ser. No. 08/673,741, entitled "Systems and Methods for Asynchronous Store and Forward Data Replication" (hereinafter referred to as the "Store and Forward Application"), which is incorporated herein by reference. Asynchronous store and forward replication, or simply store and forward replication, is designed to utilize existing network hardware, networking control software, and networking configurations as a transport system to deliver at least one-way unacknowledged communications between systems in a replication enterprise. In the context of this application, networking hardware and any associated networking control software which performs this transport function will be referred to as the Message Transport Agent (MTA). One-way, unacknowledged communication means that the store and forward replication process delivers a message to be transferred to the MTA and does not receive feedback as to the success of the transfer.

Primarily for efficiency reasons, the systems and methods that are the subject of this invention and the invention described in the copending Store and Forward Application have been designed with the presumption that no acknowledgement or feedback is required. The concepts disclosed in this application and in the copending Store and Forward Application, however, could be modified to use any status information available from the MTA. Similarly, the concepts of this invention could be used with virtually any type of replication system with appropriate modification. However, a store and forward replication system provides the presently preferred context of this invention.

Turning now to FIG. 1, an example of a network over which data is to be replicated is shown generally as 10. In this application, such a network will be referred to as a "replication enterprise" or simply an "enterprise." In a store and forward replication process, a given populated data set (data set properties with associated data objects), a copy of which is referred to as a "replica," and/or a given unpopulated data set (data set properties without associated data objects), is replicated at one or more locations in the enterprise. In FIG. 1, the locations where a replica or a copy of an unpopulated data set can reside are referred to as "replica nodes" and are shown as 12 and labeled A through F. The term "replica node" is preferred over the term "server" since "server" often implies a system which serves one or more desktop, laptop, or other computers. Replica nodes include not only servers in a traditional sense of the term, but also desktop, laptop, or any other system where a copy of a data set or data set properties may reside. In the context of this invention, "replica" will be used to refer to a specific copy of a set of one or more data objects which are to be replicated as a unit across one or more replica nodes. The terms "replica" and "data objects" are intended to be read broadly and encompass any type or format of data to be replicated. "Unpopulated data set" refers specifically to data sets without their associated data objects. The term "replica object" will be used to refer broadly either to a populated or unpopulated data set or to an individual data object.

In the enterprise, replica nodes may be grouped into "sites." A site is a plurality of replica nodes with relatively similar costs to access data. Replica nodes within a site are generally, but not necessarily, located in a relatively localized geographic area and have high connectivity between nodes, such as, for example, Local Area Network (LAN) connections. The cost to access data between sites is generally much greater than the cost to access data within a site. Site groupings are typically assigned by an administrator. FIG. 1 shows two sites, designated 14a consisting of replica nodes A, B, and C, and 14b consisting of replica nodes D, E, and F.

Replica nodes are connected by physical network connections. In FIG. 1, the physical network connections 16 are illustrated by solid arrows. As shown in FIG. 1, replica nodes 12 may not be fully connected by physical network connections 16 (note that the site containing the A, B, C, group is connected to the site containing the D, E, F, group by only a single link.) For store and forward replication, however, all that is required is the physical connections be sufficient to provide a data flow path between each of the replica nodes. Furthermore, physical connections 16 may be of any type, for example, the physical connections between replica nodes A, B, and C may be a LAN or other high-speed link while the connections between the connections between replica nodes D and B may be a slower dial-up, Internet, Wide Area Network (WAN), or other long-haul connection. All such connections are examples of networking means for interconnecting replica nodes.

By ensuring a data flow path between each of the replica nodes, the entire enterprise is logically fully connected even though physical connections are of arbitrary topology. In FIG. 1, the logical network connections forming the fully connected logical topology are illustrated by dashed arrows 18.

In a store and forward replication system, each replica node keeps track of all changes made locally to a replica object. Each replica node then periodically broadcasts new locally made changes that have occurred since the last replication broadcast through the MTA to all other replica nodes having a copy of the replica object.

Store and forward replication can be used to distribute both populated and unpopulated data sets. This is done by replicating the contents of data sets (data objects) and the properties that define data sets (data set properties). Data replication in a store and forward replication enterprise can be thought of as the distribution of copies of the contents of a container. In the case of a data set, the contents are the individual data objects that make up the data set and the replication system distributes changes made to the data objects. In the case of the data set list, the contents are the individual data set properties that define each data set.

The relationship of the data set list, the data sets, and data objects, can be illustrated as follows. Each replica node keeps a list of the data sets (whether populated or unpopulated) that it knows about. Usually every replica node in the replication enterprise knows about all data sets in the enterprise. The data set list can be illustrated as:

| Data Set List |
| --- |
| Data Set No. 1 |
| Data Set No. 2 |
| • |
| • |
| • |
| Data Set No. n |

Each data set is defined by a set of properties. This set of properties is often collected together in a property object. These properties describe or define important features of the data set. Each entry in the data set list comprises the data set properties of a data set. For example, in one preferred embodiment, each data set (and each entry in the data set list) comprises:

| Data Set Name | Data Set ID | Change Number | Time Last Modified | Replica List | Pointer to Data Objects |
| --- | --- | --- | --- | --- | --- |

The data set name is a common name for the data set that is displayed to users. The data set ID is an identifier that uniquely identifies the data set across the replication enterprise. Any type or form of ID will suffice for this purpose. For example, if the enterprise had synchronized clock values available, each ID could be drawn from the globally synchronized clock value or have the globally synchronized clock value as part of the ID. As another example, one of the replica nodes in the enterprise could be responsible for issuing ID values to all other replica nodes. Other methods could be developed and any method will work. All that is required is the ability to distinguish one replica node from another. One presently preferred method involves generating a Globally Unique ID (GUID) and concatenating it with a local counter value to form a Fast Unique ID (FUID). The GUID is a unique 16 byte value created by concatenating a 60 bit system value, a 4 bit version number identifying which version of the ID generating program is used, a 16 bit clock sequence number that is incremented every time an ID is assigned, and a 48 bit network address drawn from the network hardware of the replica node. A FUID is created by concatenating a GUID value with a local counter value that is incremented every time an ID value is assigned. More details of generating GUIDs and FUIDs can be found in the Store and Forward Application, previously incorporated by reference.

The change number is an identifier that essentially acts as a version number for the data set properties. The change number uniquely identifies the change number assigned when the data set properties were last changed. Any type or format of identifiers may be utilized for the change number as long as each change number is unique across the enterprise. In one preferred embodiment, a FUID is used for the change number.

The time last modified is the local time that the properties were last modified.

The replica list is the list of replica nodes having a copy of a populated version of the data set. The replica list acts as a distribution list for replication packets containing changes to the contents of a data set. The replica list may also contain other information, such as a replica state indicating the level of participation of each replica node on the list in the replication of the data set and a time last modified stamp indicating the time the replica state was last modified.

Although not typically utilized, it would also be possible to have distribution lists for various data set properties. In this way, the location (and even existence) of certain data sets could be kept hidden from certain replica nodes. In conjunction with security measures which restrict access to hidden data sets, the ability to hide data sets from certain replica nodes may be useful in situations where certain users only access the enterprise through a limited number of replica nodes and access to certain data sets by these users is to be restricted. Collectively, the distribution lists used for either data objects or data set properties are referred to as "replica object distribution lists."

Finally each entry in the data set list may have a pointer to a list of data objects. This list of data objects is the contents of the data set. For replica nodes having a populated data set, the pointer will point to the list of data objects. For replica nodes having an unpopulated data set, the pointer will be null.

Other information may also be included in the data set properties. For example, for conflict detection, and resolution, it may be desirable to include a predecessor change list that contains a change history of the data set properties. As another example, for hierarchically structured data, a parent property and/or path property could be included to define the hierarchy of the data sets. Conflict detection and resolution is covered in greater detail in copending U.S. patent application Ser. No. 08/673,161, entitled "System and Method for Distributed Conflict Resolution Between Data Objects Replicated Across a Computer Network" (hereinafter the "Conflict Resolution Application"), incorporated herein by reference. Replication of hierarchically structured data is covered in greater detail in copending U.S. patent application Ser. No. 08/674,209, entitled "System and Method for the Distribution of Hierarchically Structured Data" (hereinafter the "Hierarchical Data Replication Application"), incorporated herein by reference.

To further illustrate the replication of populated and unpopulated data sets, consider that one replica node might receive only replication packets containing data set properties. Assuming that this replica node received the replication packets containing data set properties for all data sets in the enterprise, this replica node will then have a copy of the data set list (or "set of data sets") available in the enterprise. The data objects associated with each entry in the data set list are not available locally, however. This replica node has unpopulated data sets. Another replica node may receive both replication packets containing data set properties and replication packets containing data objects. Assuming that this replica node received all such replication packets, this replica node has copies of both the data set list and the data objects associated with each entry in the data set list. This replica node has populated data sets. It is rare that a replica node has either all populated or all unpopulated data sets. Typically, a replica node will receive replication packets containing data set properties for all data sets and replication packets containing data objects for some data sets. These replica nodes have a complete data set list with some populated data sets and some unpopulated data sets.

2. Summary of Discovery-Based Data Recovery

Because messages sent via the MTA to other replica nodes are one-way, a mechanism is usually put in place to ensure that all replica objects throughout the enterprise are synchronized, or in other words, are up-to-date. If a new replica node is added to the replica object distribution list of a replica object, either because the replica node just came on line or because a decision was made to send the replica object to a new node, this mechanism must quickly and efficiently allow the replica node to receive changes to the replica object that happened before the replica node was added to the replica object distribution list. Furthermore, if messages are lost or not received properly through the MTA, then the mechanism must be able to quickly and efficiently recover the lost data. These situations are typically addressed by a data recovery mechanism like that described in copending U.S. patent application Ser. No. 08/670,588, entitled "System and Method for Discovery Based Data Recovery in a Store and Forward Replication Process" (hereinafter referred to as the "Backfill Application"), incorporated herein by reference.

Figure 2:
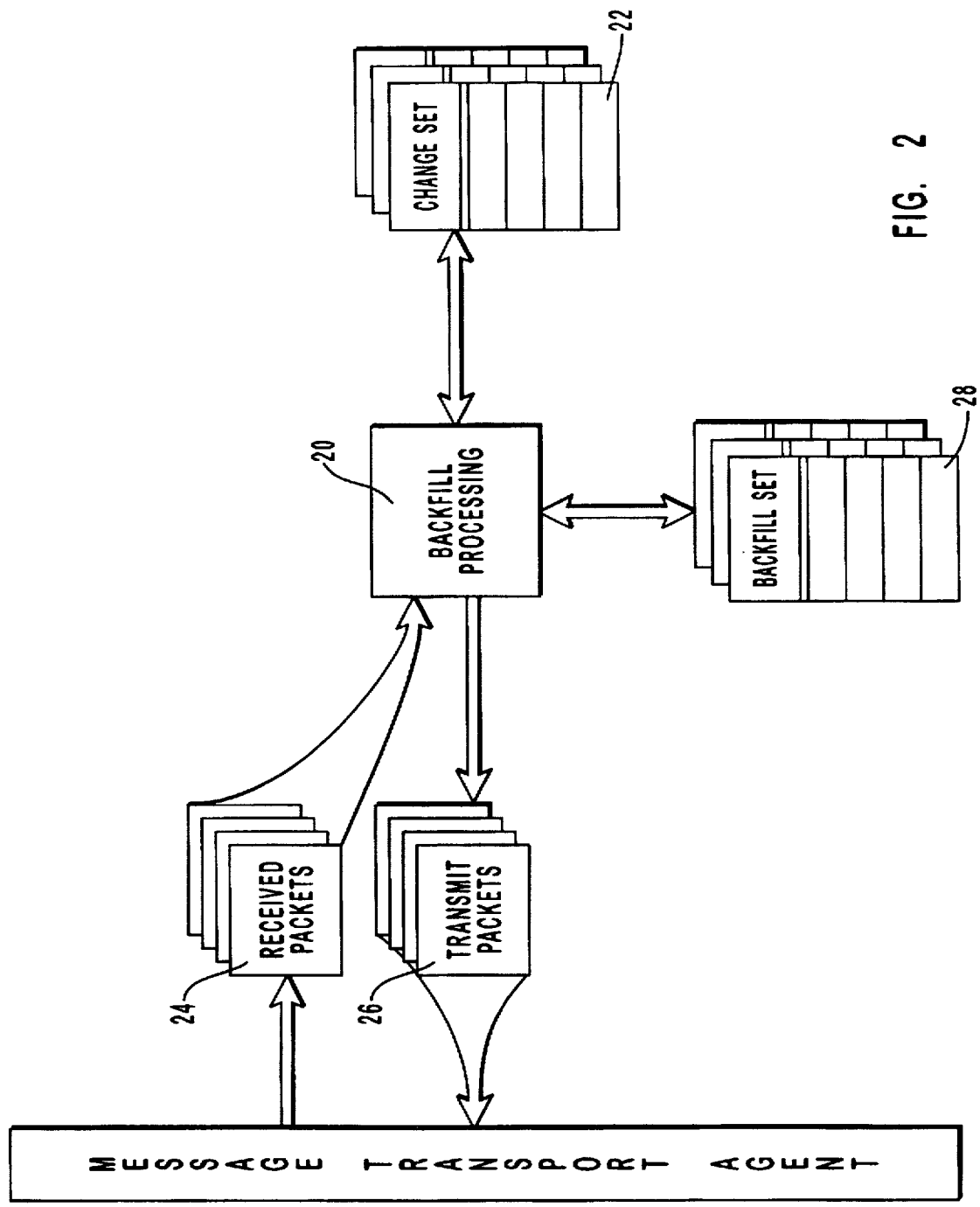
FIG. 2 is a simplified diagram representing an example data recovery process.

FIG. 2 presents a greatly simplified high-level, block diagram of a discovery based data recovery process. In FIG. 2 the discovery based data recovery process is illustrated by backfill processing block 20. As changes are made to the local copy of a data set, the changes are identified by a unique identifier such as a change number, as explained below. The change numbers associated with the changes to the data set that have been replicated to other replica nodes in the enterprise are stored in a local change set such as change set 22. One change set is kept for each copy of a different data set on the replica node. As changes are received from other replica nodes in the enterprise, the change numbers corresponding to those changes are also stored in the change set associated with the data set. Thus, the local change set, as for example change set 22, contains changes made locally that have been replicated to other replica nodes in the enterprise, and changes received from other replica nodes in the enterprise.

The changes stored in the local changes sets are broadcast to other replica nodes in the enterprise. As explained in the copending Backfill Application, previously incorporated by reference, change sets may be included in a wide variety of packet types. These packet types are illustrated in FIG. 2 by received packets 24 and transmit packets 26. For example, in the Backfill Application four different packet types are used. Data request packets are used to request data missing from the local replica node from other replica nodes with the data. Data packets are used to fill data requests. Data packets are also used by the replication process to distribute changes made to a replica object. Information packets are used to broadcast status information such as the local change set. Information request packets are used to request status information, such as the change set of another replica node. More information about the types and uses of the various transmit and receive packets is contained in the copending Backfill Application and the copending Store and Forward Application.

In addition to the other uses of these packets, they also provide a way to distribute the local change set to other replica nodes in the enterprise. When a change set for a particular data set is received from other replica nodes in the enterprise, backfill processing block 20 compares the received changed set to the corresponding locally stored change set. By comparing the two change sets, any information contained in the received change set but missing from the local change set can be identified. The differences in the received change set and the locally stored change set thus identify changes that are held by another replica node but which are not held locally.

If backfill processing block 20 identifies changes that are held by other replica nodes but which are not held locally, backfill processing block 20 then undertakes a process to recover the missing data from replica nodes that have the relevant data. Changes that are held by other replica nodes but which are not held locally are entered into backfill set 28. The entries in the backfill set can then be used to generate messages which are sent to one or more other replica nodes requesting the missing changes. As those requests are filled, the entry can be removed from backfill set 28 and added to change set 22. Further details of the backfill process are described in the copending Backfill Application, previously incorporated by reference.

3. Description of Time Based Data Expiration

Figure 3:
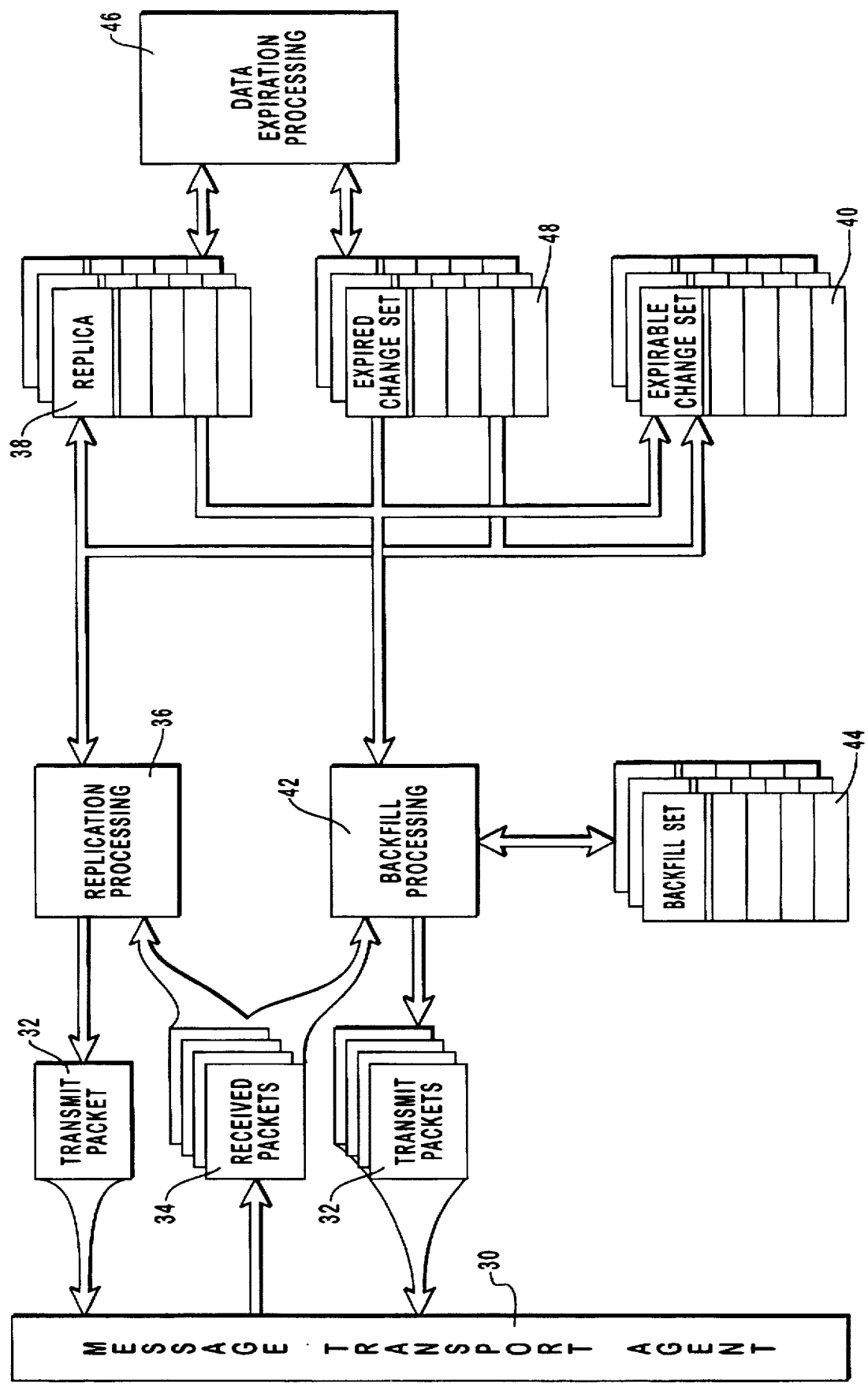
FIG. 3 is a block diagram representing the relationship of the systems and methods of time base data expiration of the present invention to an associated replication process and data recovery process.

Referring next to FIG. 3, one embodiment of a time based data expiration system of the present invention is illustrated. The diagram in FIG. 3 presents a more complete view of how the various processes of a system implementing time based data expiration may work together to achieve the goals of this invention. As described previously, data replication occurs by delivering messages to a Message Transport Agent (MTA), as for example MTA 30 of FIG. 3, for delivery to one or more other replica nodes. The various types of data packets which are transmitted and received by Message Transport Agent 30 are illustrated by transmit packets 32 and received packets 34. Transmit packets 32 and received packets 34 represent any number or types of message packets that are used to achieve the process of data replication and any associated data recovery.

A general data replication process is illustrated in FIG. 3 by replication processing block 36. Replication processing block 36 is preferably a store and forward replication process. As previously explained, a local copy of a data set is stored in a replica, such as replica 38. As previously defined, a replica is a particular copy of a particular data set on a particular replica node. Thus, a single replica node may have a plurality of different replicas. This is illustrated in FIG. 3.

New changes made to replica 38 are periodically broadcast by replication processing block 36 to other replica nodes also having a copy of that particular data set. Changes made to replica 38 are preferably identified with a unique change number. Unique change numbers allow individual changes made to a particular data set to be tracked across the enterprise and identified by all replica nodes. Although any type or format of unique identifier will suffice, it is presently preferred that such change numbers have the form of a unique replica node ID concatenated with a local counter value that is incremented every time an identifier is assigned. The unique replica node ID can be a GUID value, as previously discussed. This type of unique identifier is sometimes referred to as a Fast Unique ID (FUID). The process of generating FUID values by concatenating a unique replica node ID with a local counter value is described in greater detail in the copending Store and Forward Application, previously incorporated by reference.

Utilizing FUIDs which are generated by concatenating a unique replica node ID with a local counter value provides several benefits. Because FUID values are assigned sequentially from a local counter of a particular replica node, for changes made by a particular replica node, changes with a higher counter value occurred later in time. Thus, if the unique replica node ID portion is represented by a letter and the local counter value portion by a number, then change number G-25 occurred later than change number G-17. In this application, change numbers will comprise a letter representing the replica node indentifier, a "-" character, and then a number representing the local counter value.

As change numbers are assigned over time, change ranges develop. For example, suppose replica node B made three changes to a particular data set with change number B-5, B-8, and B-93. These three change numbers could be represented by a change range B-1:93. This change range illustrates the format of change ranges used in this application. A change range is described by a minimum and maximum change number. The change range is inclusive of this minimum and maximum change number. In this application, a change range will comprise a letter representing the replica node identifier, a "-" character, the counter value of the minimum change number, a ":" character, and the counter value of the maximum change number.

This example also illustrates another aspect of change ranges. Change ranges may be sparsely populated. If FUID values are used for a variety of purposes and only one local counter is used, the changes may not form a contiguous range. However, storing the changes as a contiguous range results in lower storage size and does not detract from the usefulness of change numbers to identify particular changes. Thus, in the above only three changes, B-5, B-8, and B-93 exist in the change range B-1:93.

As the changes made to replica 38 are replicated to other replica nodes in the enterprise, the change numbers associated with those changes are stored in a change set. Thus, embodiments within the scope of this invention can comprise means for storing a list of changes made to a data set. In FIG. 3, such means comprises, for example, expirable change set 40. As previously described, these changes may be changes made locally or changes received from other replica nodes in the enterprise. Obviously the exact source of the changes stored in expirable change set 40 will depend on the exact replication process used by replication processing block 36. For purposes of this invention, however, expirable change set 40 comprises those changes which are made to replica 38 and which may, at some point in the future, expire.

As an example of one change set which comprises both changes made locally and changes replicated in from other servers:

| Locally Made Changes | Replicated In Changes | Local Change Set |
|---|---|---|
| A-1:1200 | + C-1:200<br>E-300:1000<br>H-1000:2000 | = A-1:1200<br>C-1:200<br>E-300:1000<br>H-1000:2000 |

As illustrated above, a change range is stored for each replica node making changes to the data set. It is worth noting that in a preferred embodiment the locally made changes are not included in the local change set until they are replicated out to other replica nodes. This is discussed further below.

As previously explained, in order to recover any data missing from local replica 38, a data recovery mechanism may be used. In FIG. 3, a general data recovery process is illustrated by backfill processing block 42. Backfill processing block 42 may implement the backfill process as described in the copending Backfill Application. As described therein and summarized above, backfill processing block 42 will compare change sets received from other replica nodes via message transport agent 30 with the local change set stored in expirable change set 40. If changes are held by other replica nodes that are not held locally, an entry will be made in backfill set 44. Backfill set 44 can then be used to generate requests to other replica nodes in the enterprise for missing data and track the responses to such requests.

As an example, consider a locally stored change set of:

| Stored Change Set |
|---|
| A-1:200 |
| B-1:1000 |

Also consider a received change set of:

| Received Change Set |
|---|
| A-50:500 |
| C-1:90 |

The backfill set would then be calculated as:

| Received Change Set | Local Change Set | Backfill Set |
|---|---|---|
| A-50:500<br>C-1:90 | − A-1:200<br>B-1:1000 | = A-201:500<br>C-1:90 |

The process as described to this point replicates data among various replica nodes and identifies changes missing from the local copy of the data by comparing change sets received from other replica nodes with a local change set. If time based data expiration is now added to this process, care must be taken not to disrupt either the data replication process or the data recovery process. As data is expired and deleted from the local replica node, two goals should be achieved. The first goal is to not recover expired data from other replica nodes. Recovery of expired data from other replica nodes would defeat the purpose of time based data expiration. The second goal that should be achieved is to ensure that other replica nodes will not request data that has been expired through a data recovery mechanism.

Data expiration processing block 46 of FIG. 3 implements the time based expiration of the present invention. The time based data expiration method of the present invention preferably allows an administrator to specify an age limit that applies to all replicas on a given replica node, all replicas of a given data set, or a single replica of a given data set. This can be accomplished by setting age limits for some or all replicas on some or all of the replica nodes in the enterprise. Data expiration processing block 46 then uses these age limits to expire data from the various replicas on the local replica node.

As explained in greater detail below, data expiration processing block 46 periodically scans the replicas on the local replica node looking for replicas with an age limit. Data expiration processing block 46 then examines the data objects in a replica having an age limit, as for example replica 38, for data objects which are older than a specified time. Data objects older than this specified time are said to have "expired." As data expiration processing block 46 identifies expired data objects in replica 38, it removes such data objects from replica 38 and stores the changes corresponding to those data objects in expired change set 48. The changes are stored in expired change set 48 by adding them to a change range for the particular replica node. One change range is stored for each replica node and the change range begins with change number 1 and ends with the maximum change expired for that replica node. For example, if change C-29 was the last change expired for replica node C, then the entry for replica node C in expired change set 48 would be C-1:29. Since change numbers are always allocated in ascending order, this is sufficient. Replication processing block 36 and/or backfill processing block 42 can then use the information in expired change set 48 to modify their processes to achieve the goals of the present invention.

Figure 4:
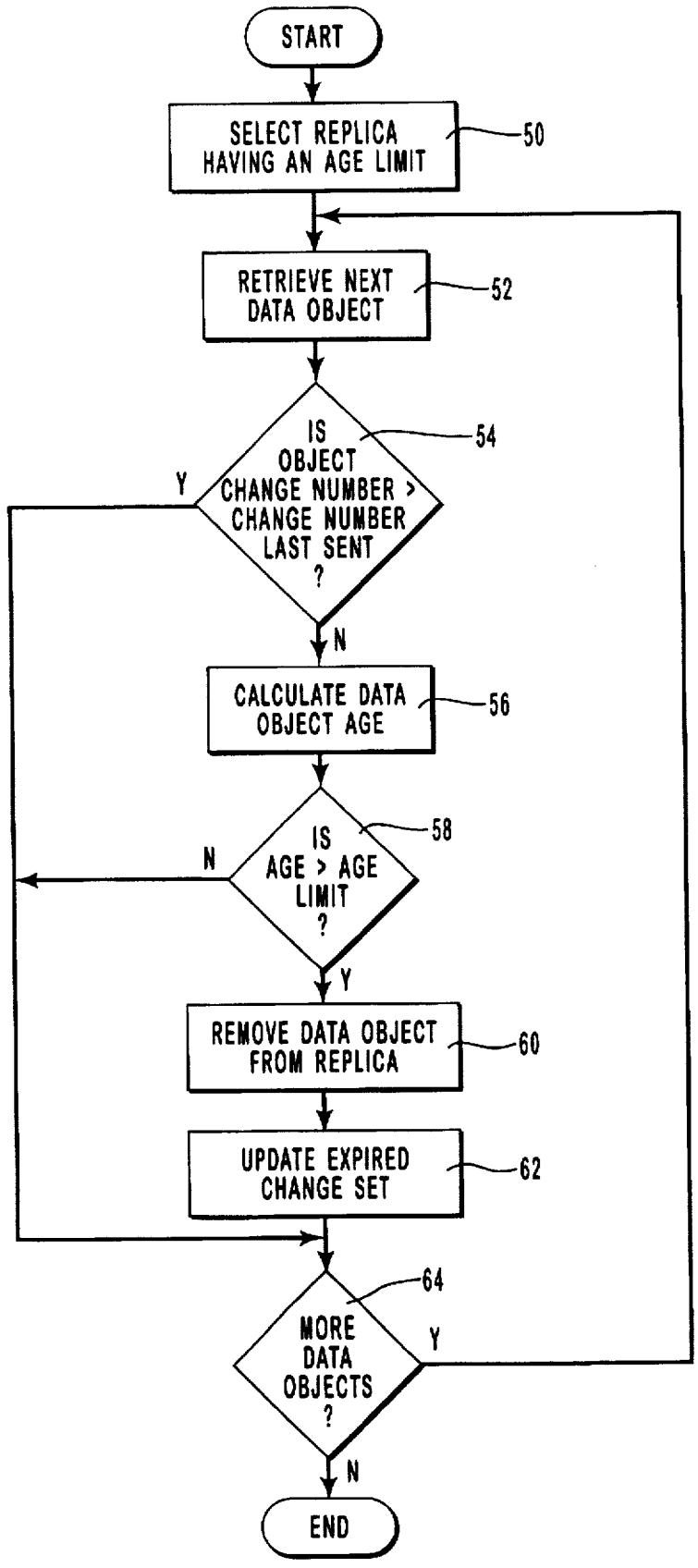
FIG. 4 is a flow diagram representing the processing of one embodiment implementing time based data expiration.

The data expiration process summarized above is disclosed in greater detail in FIG. 4. Since it is possible that certain replicas on the replica node have an age limit and certain replicas on the replica node do not have an age limit, embodiments within the scope of this invention may comprise means for identifying replicas that have age limits. Any mechanism for identifying a replica as having an age limit will suffice. For example, embodiments within the scope of this invention may keep a list of replicas on the local replica node (e.g. the data set list). This data set list may comprise the properties of the data set as well as other information. It may be desirable to store an age limit parameter as part of the data set list as an unreplicated property of the data set. By storing a special value in the age limit parameter, replicas not having an age limit may be identified. Such a special value may comprise any value that is interpreted as no age limit. Other replica nodes having a valid age limit parameter may then be identified as replicas having an age limit. Note that if such a scheme is used, the age limit parameter is not replicated as part of the data set properties. In other words, such a parameter would not be replicated among the various replica nodes in the enterprise when the data set properties are replicated to other replica nodes.

Other age limits may also be used. For example, the means for identifying replicas that have age limits may employ an age limit for all replicas on the replica node. Embodiments may also employ an age limit for all copies of a particular data set on all replica nodes. Any other mechanism of identifying replicas with age limits and distinguishing them from replicas without age limits can be utilized.

Embodiments within the scope of this invention may also comprise means for selecting a replica node with an age limit for processing. By way of example, and not limitation, in FIG. 4 such means is illustrated by step 50. As previously explained, data expiration processing block 46 of FIG. 3 periodically examines the list of replica nodes and scans each replica having an age limit for data objects which have expired. Thus, the first step in the time based expiration process is selecting a replica to scan for expired data objects. Any method of selecting the next replica to be processed may be utilized. For example, the replicas may be processed sequentially, one after the other.

As indicated by step 52 of FIG. 4, the next step in the time based data expiration process is to retrieve the next data object. The time based data expiration process examines each data object in a replica looking for expired data objects. Thus, each data object in the replica must be checked for an age greater than the age limit. Step 52 indicates this processing.

As previously described in conjunction with replication processing block 36 and backfill processing block 42, changes are not considered part of a change set until the changes have been replicated to other replica nodes in the enterprise. The reason for this is fairly straightforward. If a change set containing changes that have not been replicated to other replica nodes is sent to other replica nodes, then any data recovery mechanism employed would identify those changes as missing. In the case of backfill processing block 42, this would result in requests for those changes being generated by all replica nodes receiving such a change set. In other words, a situation will arise where changes are identified as missing and requested before such changes are even sent. Such a situation is highly inefficient. Therefore, changes which have not yet been replicated out to other replica nodes are not included in any change set which is broadcast to other replica nodes.

In order to avoid such a situation, embodiments within the scope of this invention may comprise means for tracking which changes have been replicated out to at least one other replica node. If FUID values are used for change numbers, such means may comprise, for example, a "largest change replicated" value. The largest change replicated value is set to the largest change number replicated to other replica nodes. Since FUID values are assigned by incrementing a local counter, FUID values with a higher counter value occur later in time. Thus, if the last change replicated was A-10, then any changes assigned after that point in time will have a larger counter value (11 or higher). Thus, by keeping the largest change replicated, entries in a data set which have not been replicated can quickly be identified during a replication broadcast.

The means for tracking which changes have been replicated out to at least one other replica node, such as the largest change replicated value, can be used to prevent data objects in a replica from expiring and being deleted before they are replicated to at least one other replica node in the enterprise. Various scenarios present such a possibility. For example, suppose that the age limit was set to a relatively short value, for example 24 hours. Suppose further, that for whatever reason the replication interval (the interval between replication broadcasts) was larger than 24 hours. In such a situation, changes made to data objects in a replica would be deleted before they were ever replicated out. Other scenarios may also present such a possibility. Decision block 54 of FIG. 4 prevents changes made to a data object from expiring before they have been replicated to other replica nodes.

By now, it should be clear that embodiments within the scope of this invention depend on an ability to distinguish expired data objects from non-expired data objects. Embodiments within the scope of this invention can, therefore, comprise means for identifying data objects that are older than a specified time in order to identify any expired changes. In FIG. 4, such means is illustrated by step 56 and decision block 58. Any method of identifying expired data objects can be utilized. In one preferred embodiment, each data object carries a time last modified stamp. This time last modified stamp can be compared to the local time value in order to identify any data objects which are older than a specified time. Thus, the age of a data object can be calculated by subtracting the time last modified from the current time. If the time differential is greater than the age limit, then the data object has expired. In FIG. 4, the age of a data object is calculated in step 56 and compared to the age limit in decision block 58.

Embodiments within the scope of this invention can comprise means for removing expired data objects from the local copy of the data set. By way of example, and not limitation, in FIG. 4 such means comprises step 60. When a data object has expired, it is removed from the replica and deleted. Any mechanism which accomplishes this function may be utilized. If, however, a data object has not expired, then the data object is left in the data set as represented in FIG. 4 by the "N" branch out of decision 58.

Again it should be emphasized that when data objects expire, the delete of step 60 is not replicated to other replica nodes. Replicating this delete would cause all replica nodes to delete the data object. This is not the goal. The goal of the present invention is to remove the object locally without affecting other copies in the enterprise.

Embodiments within the scope of the present invention may also comprise means for tracking which entries in a change set have expired and which entries in a change set have not expired so that both the expired changes and the non-expired changes can be identified. As previously described, when a change is made to a data object, a new change number and a time last modified stamp are assigned to the data object. After replication of the change, this change number is also part of a change set. When data objects expire and are removed from the replica, it is important to identify the corresponding change number in the change set as having expired. The reason for this can be explained by considering both the data replication process and the data recovery process.

Returning for a moment to FIG. 3, as previously described, replication processing block 36 and/or backfill processing block 42 will broadcast the local change set when sending messages to other replica nodes. If such a broadcast change set includes changes which have expired, it is possible that another replica node in the enterprise will request the expired changes in the process of recovering lost data. Such a situation is undesirable because the local replica node no longer has those changes to transfer to other replica nodes. Such a situation can be prevented by removing from the broadcast change set any expired changes. One method of accomplishing this would be to simply delete any expired changes from the local change set just like data objects are removed from the local replica. However, for other reasons, such a implementation is likely to be unacceptable.

One reason why removing expired changes from the local change set is undesirable can be identified from examining backfill processing block 42 of FIG. 3. As previously described, when a change set is received from other replica nodes, backfill processing block 42 compares the received change set to the locally stored change set to identify any changes held by the other replica node but not held locally. If a replication enterprise had one replica node which never expired data and another which expired data, then change set of the replica node which never expired data would eventually be sent to the system that expired data. If the system that expired data has removed expired changes from its local change set, then when the backfill set is created, the expired changes would be identified as changes missing from the local change set. The data recovery process would then seek to backfill the expired changes. Obviously, such a system would defeat the purpose of time based data expiration.

The above examples illustrate that for purposes of data recovery expired changes must be included in the local change set. For purposes of broadcasting the local change set, however, expired changes must be removed before the local change set is broadcast. These two requirements mean that it would be desirable to track both expired changes and non-expired changes.

Any mechanism which tracks both expired changes and non-expired changes can be utilized for the means for tracking which entries in the local change set have expired and which entries in the local change set have not expired. As previously explained, if FUID values are used for change numbers, then for change numbers issued from a particular replica node, change numbers issued later in time are guaranteed to have a counter value larger than change numbers issued earlier in time. Since time based expiration expires change numbers issued earlier in time before change numbers issued later in time, then in order to identify which changes in a change set have expired, only the largest expired change number from each replica node needs to be stored. All change numbers which are less than the largest expired change number are guaranteed to have previously expired as well.

Referring for a moment to FIG. 3, the means for tracking which entries in a change set have expired and which entries in a change set have not expired can comprise, for example, expired change set 48 and expirable change set 40. In FIG. 3, expirable change set 40 may be the locally stored change set which includes both changes that have not yet expired and changes that have expired. Expired change set 48 can then comprise the set of changes that have expired. In such a case, the external change set which is broadcast to other replica nodes when replication packets are transmitted can be calculated by subtracting expired change set 48 from expirable change set 40. For example:

| Expirable Change Set | Expired Change Set | External Change Set |
|---|---|---|
| A-30:500 | − A-30:150 | = A-151:500 |
| C-1:100 | {0} | C-1:100 |
| H-1:1200 | H-1:1200 | |

Alternatively, expirable change set 40 can comprise only non-expired changes. In such a case, expirable change set 40 could be used for the external change set, but expired change set 46 would have to be added to expirable change 40 before calculating a backfill set. As previously described, the backfill set must be calculated based on a locally stored change set that includes expired changes. Otherwise, the backfill mechanism will try to recover the expired changes.

As previously indicated, however, in order to uniquely identify the changes which have expired from the changes which have not expired only the largest expired change number from each replica node needs to be stored. If the external change set is calculated by subtracting an expired change set from an expirable change set, then some way must exist to create the expired change set from the largest expired change number for each replica node. Such a conversion can be easily accomplished by converting the largest expired change number into change range. As previously discussed, all changes previous to the largest expired change number are guaranteed to have already expired. Thus, a largest expired change number of D-500 can be converted to an expired change range of D-1:500. If the embodiment illustrated in FIG. 3 stored only the largest expired change number for each replica node, then after converting the largest expired change number for each replica node into a change range, the example calculation for the external change set illustrated above would be:

| Expirable Change Set | Expired Change Set | External Change Set |
|---|---|---|
| A-30:500 | − A-1:150 | = A-151:500 |
| C-1:100 | {0} | C-1:100 |
| H-1:1200 | H-1:1200 | |

Note that in the above example the expired change set would have been derived from largest expired change number A-150 and largest expired change number H-1200. As illustrated by these two examples, the external change set calculated in either case is the same.

Returning now to FIG. 4, after the expired data object has been removed from the replica as illustrated in step 60, the next step is to update the expired change set. This is illustrated in FIG. 4 by step 62. The process of updating the expired change set can occur as previously described above either by adding the change numbers of the deleted data objects to an expired change set, as for example expired change set 48 of FIG. 3, or by updating the largest expired change number for the appropriate replica node, if that approach is selected over storing an expired change set. In either case, step 62 of FIG. 4 can represents yet another example of means for tracking which entries in a change set have expired and which entries in a change set have not expired.

After the expired change set has been updated, or if steps 60 and 62 have been bypassed because the age of a data object is not greater than the age limit, then decision block 64 retrieves the next data object in the replica if any more exist. If the replica contains no more data objects, then the process ends, or more particularly, another replica with an age limit is selected for processing if any exist.

The present invention also includes within its scope embodiments directed to handling mixed data sets. As described previously, situations exist where a data set may contain both expirable data objects and non-expirable data objects. In such a mixed data set, expirable data objects would expire subject to an age limit as previously described. The non-expirable data objects, however, would not be subject to an age limit and would be retained until explicitly deleted by a user.

Figure 5:
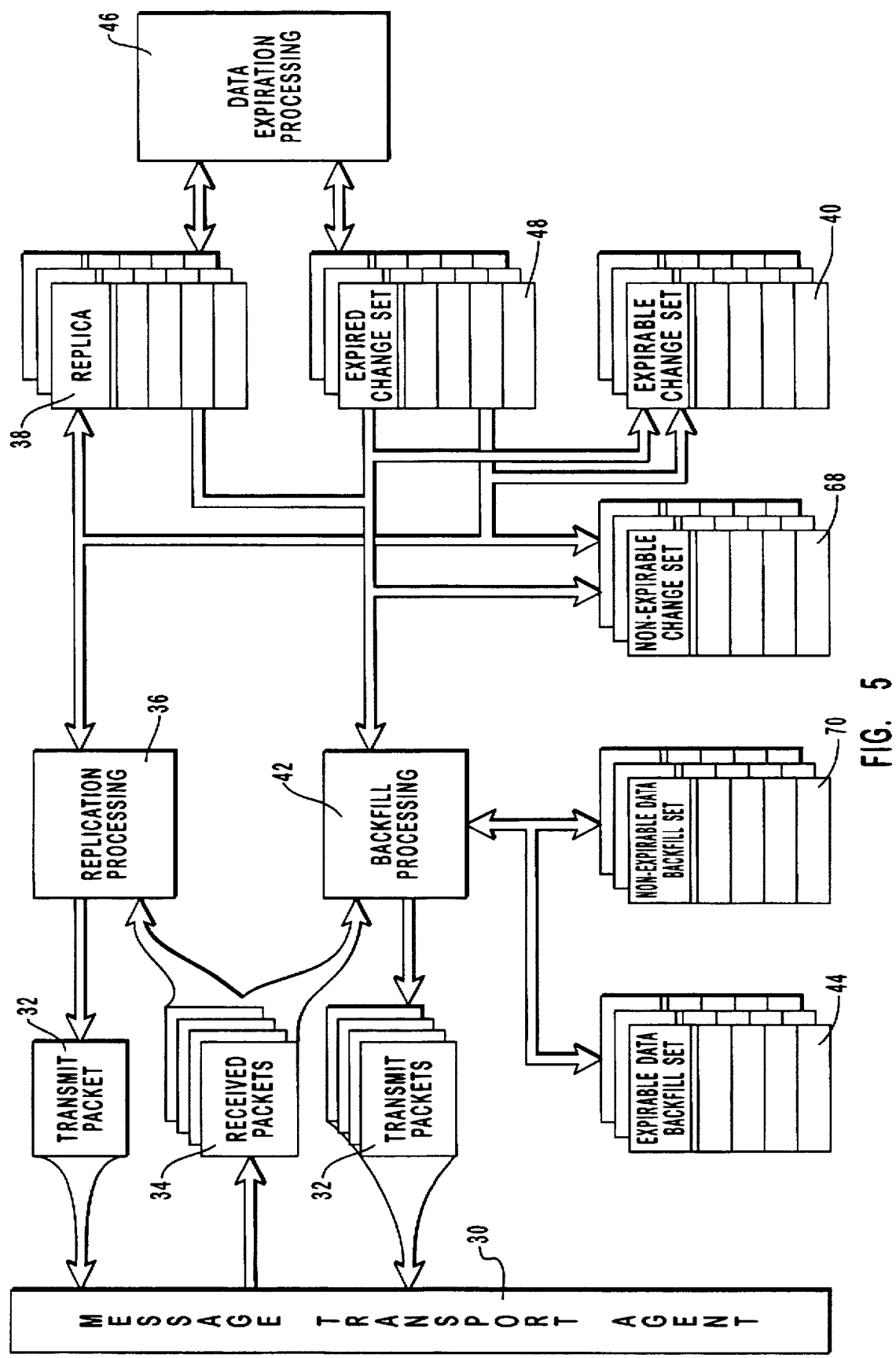
FIG. 5 is a diagram representing the relationship of the systems and methods of time based data expiration of another embodiment to an associated replication process and data recovery process.

An embodiment designed to handle mixed data sets is illustrated in FIG. 5. The embodiment in FIG. 5 is very similar to the embodiment illustrated in FIG. 3, and corresponding elements are numbered the same.

The primary difference between the embodiment illustrated in FIG. 3 and the embodiment illustrated in FIG. 5 is the ability to track non-expirable data objects. Thus, embodiments which are designed to handle mixed data sets can comprise means for storing a list of changes made to data objects that are of a type that do expire and means for storing a list of changes made to data objects that are of a type that do not expire. By way of example, and not limitation, in FIG. 5, the means for storing a list of changes made to data objects that do expire comprises expirable change set 40. Also by way of example, means for storing a list of changes made to data objects that do not expire may comprise non-expirable change set 68.

One way to handle mixed data sets is to track changes made to expirable data objects separately from changes made to non-expirable data objects. This leads to a situation where the expirable data objects may be handled as previously illustrated in FIGS. 3 and 4. Corresponding structures are included in FIG. 5. However, to handle changes made to non-expirable data objects, a non-expirable change set, such as non-expirable change set 68, must be kept.

Additional changes must also be made to replication processing block 36 and backfill processing block 42. Because two change sets now exist (an expirable change set and an non-expirable change set), when replication packets are transmitted to other replica nodes in the enterprise, both the non-expirable change set and the external change set corresponding to the expirable change set must be transmitted. Furthermore, as changes are made to data objects in a replica, the new change numbers must be included in both the expirable change set and the non-expirable change set. The example which follows explains these points in greater detail.

Suppose at time $T_1$ data object 1, which is non-expirable, was added to replica 38 of FIG. 5. Also suppose that a change number of A-20 was assigned to this object when it was created. At this point, replica 38 would contain a data object with at least the following information:

| Replica ||||
|---|---|---|---|
| N | A-20 | $T_1$ | Data Object |

In the above, the "N" flag indicates that the data object is non-expirable, the change number is A-20, the time last modified status is $T_1$ and, of course, the data object is included in the replica entry. Other information may also be stored with the data object, as required by replication processing block 36, backfill processing block 42 or some other processing.

After the data object is created, inserted into the replica, and replicated to other replica nodes, the expirable change set and non-expirable change set will be updated to include the change number of the created data object. Assuming that no changes have been received for this data object from other replica nodes, the non-expirable change set and expirable change set will contain:

| Non-expirable Change Set | Expirable Change Set |
|---|---|
| A-1:20 | A-1:20 |

Note that same change number was entered in both the non-expirable change set and the expirable change set, even though the change was made only to a non-expirable data object. This illustrates a point about change sets and change numbers for particular data objects. The change set contains change ranges which include the change numbers that have been assigned by a particular replica node. In this case, the local replica node, replica node A, has assigned a change number. This change number extends both the change range of the non-expirable change set and the change range of the expirable change set. The local replica node only has a single counter to assign change numbers from. Thus, the change range in both the expirable and non-expirable change sets needs to be extended. If this were not the case, then when the expirable and non-expirable change sets were replicated to other replica nodes it may look like some changes are missing. Such a scenario would likely cause a backfill entry to be generated and a request for the missing changes to be sent. Thus, just because a change range covers a certain range does not mean that every change number in that range exists in the replica.

Continuing with the above example, suppose now that at time $T_2$ an expirable data object was created in the replica. The replica would then contain two data objects as follows:

| Replica | | | |
|---|---|---|---|
| N | A-20 | $T_1$ | Data Object |
| E | A-37 | $T_2$ | Data Object |

As indicated above, a new entry which is expirable, has change number A37, and was created at time $T_2$ has been added to the replica. At this time the non-expirable and expirable change sets are:

| Non-expirable Change Set |
|---|
| A-1:37 |

| Expirable Change Set |
|---|
| A-1:37 |

Now if no more changes are made to these two data objects and data object A-37 expires and is deleted, then an entry will be made into the expired change set of A-1:37. Now when the non-expirable and expirable change sets are included in replication packets transmitted to other replica nodes, the non-expirable change sets will contain the entry of A-1:37 and the expirable change set will be empty since there are no expirable changes which have not already expired and been removed from the replica. Using the non-expirable change set, the expirable change set, and the expired change set in this manner ensures sufficient information is available for proper operation of both the replication processing and the backfill processing.

Since the non-expirable change set and expirable change sets are replicated independently, it is possible to calculate an expirable backfill set and a non-expirable backfill set. In FIG. 5, this capability is illustrated by expirable data backfill set 44 and non-expirable data backfill set 70. The following example will give some feel for how backfill processing may be accomplishing when mixed data sets are replicated.

Suppose that there are three data set objects on server A in the change range A-1:1000. Data set object 1 has change number A-100, data set object 2 has change number A-500, and data set object 3 has change number A-1000. Further suppose that data objects 1 and 3 are expirable data object and data object 2 is a non-expirable data object. Finally assume that no data has yet been expired from this replica node. In such a case, the non-expirable change set and the expirable change set will both contain the same entry of A-1:1000. Since no data has been expired, these change sets will be replicated to other replica nodes in the enterprise. Suppose that the change sets were received by replica node D which had none of the changes stored on replica node A. Thus, from replica node D's point of view, the local expirable change set, the local non-expirable change set, the received expirable change set, and the received non-expirable change set would be:

| Local Expirable Change Set |
|---|
| {0} |

| Local Non-Expirable Change Set |
|---|
| {0} |

| Received Expirable Change Set |
|---|
| A-1:1000 |

| Received Non-Expirable Change Set |
|---|
| A-1:1000 |

In such a case an entry would be created in both the expirable data backfill set and the non-expirable data backfill set of A-1:1000, indicating that all changes in this range would need to be obtained for both the expirable data and the non-expirable data. At this point, replica node D can only request the changes from replica node A.

Suppose that replica node D requested the changes from replica node A but, while the request was being generated and sent to replica node A, the data object corresponding to change number A-100 had expired and was deleted. Replica node A would then be in a situation of being asked for changes which no longer exist. If A is asked for both the non-expirable and expirable changes, A could respond either with two packets, one containing expirable changes and one containing non-expirable changes, or may respond with a single packet containing both expirable and non-expirable changes. Which method is chosen is implementation dependent and is not critical for this invention.

When replica node A responds to the request from replica node B, replica node A will return the non-expirable changes that it has (the data object corresponding to change number A-500) and the expirable changes that it has (the data object corresponding to the A-1000 change number). As previously explained, it is preferred that replica node A also return the change sets available on the replica node. In this case, two such change sets would be returned, one for the expirable data and one for the non-expirable data. The non-expirable data has a change set with the entry A-1:1000. This indicates that non-expirable changes corresponding to change numbers A-1 through A-1000 are available on replica node A. The change set for the expirable data would have an entry of A-101:1000, indicating that expirable changes A-101 through A-1000 were available on replica node A.

In addition to the change sets describing the changes which are available on the replica node, it may also be desirable to include the change range which describes the data objects being returned. This concept is explained in the copending Backfill Application. In this case, the change range describing the data objects is the same as the change set available since replica node D asked replica node A for all the changes it possessed. Thus, the change ranges describing the data objects would be A-1:1000 for the non-expirable data objects and A-101:1000 for the expirable data objects. If the data requested was less than all the changes held at a replica node, the change range describing the data returned may be different from the change set available on the replica node.

This example highlights an important point. If a replica node asked for A-1:1000 in the expirable change set, the replica node believed that the data was available when the request was made. This belief was based on the last received change set. The data may have been available when the request was made, but before the request was filled, the replica node filling the request expired up to change A-100. In this case the change range for the data packet would be A-1:1000. The change set available would be A-101:1000. The fact that the replica node filling the request does not include the change range A-1:100 in its change set available tells the replica node receiving the data that the changes no longer exist on the sending replica node, and they must be backfilled from another replica node.

In summary, when mixed data sets are replicated around an enterprise, the following modifications should be made:

1. Replica nodes store an expirable change set, an expired change set (or its equivalent), and a non-expirable change set. These three change sets describe the locally available changes.
2. All replication packets transmitted should contain two change sets. One change set describes the locally available non-expirable changes and the other change set describes the locally available expirable changes. The change set describing the locally available expirable changes is calculated by removing any expired changes from the expirable change set.
3. Each replica node stores expirable and non-expirable change sets for each replica node as they are received. This allows the local replica node to identify where various expirable and/or non-expirable changes may be obtained.
4. Replica nodes keep expirable and non-expirable backfill sets. This allows missing non-expirable and expirable changes to be requested separately, perhaps from different replica nodes.
5. Replication data packets used to broadcast new changes to mixed data sets, may contain mixed data set objects. If mixed data set objects are contained in a single data packet, then two change ranges describing the non-expirable and expirable data can be included. Note that for new changes, the expirable and non-expirable change ranges will always be the same, and both are included for compatibility with other packet types. Alternatively, a new packet type can be created and only a single change range sent.
6. Because an expirable data backfill set and a non-expirable data backfill set are kept separately, expirable and non-expirable changes may be requested either separately, or together.
7. Responses to backfill requests may be filled by different packets each containing a single data object type (expirable or non-expirable) or with packets containing both expirable and non-expirable data objects. In either case, it is desirable to include a change range describing the data returned. Thus, if a data packet only contains expirable data, then the expirable change range describing that data will also be returned. If the packet contains non-expirable data only, then the non-expirable change range describing the data should be returned. If a data packet contains both expirable and non-expirable data, then both a change range describing the expirable data and a change range describing the non-expirable data should be returned.

In summary, the time based data expiration systems and methods of the present invention provide a highly flexible and highly robust environment where an administrator can set an age limit for all copies of a particular data set on all replica nodes, all copies of all data sets on a particular replica node, or any combination thereof. In addition, the time based data expiration systems and methods of the present invention properly handle mixed data sets that include some data objects which expire and other data objects which do not expire. In each case an administrator has total flexibility to configure an enterprise with any combination of time based data expiration age limits. All systems and methods of the present invention will prevent expired data from being recovered via any data recovery mechanism and will also prevent other replica nodes from attempting to recover expired changes from a replica node.

What is claimed and desired to be secured by United States Letters Patent is:

1. In a replication enterprise comprising a plurality of replica nodes, each of which may make changes to a data object and each of which replicate changes made to the data object to other replica nodes so that changes made to one copy of a data object on one replica node are reflected in other copies of the data object, a method for removing expired data objects that are older than a designated time from one node without removing data objects from the remainder of the nodes and without causing recovery of the removed data objects from other replica nodes, the method comprising the steps of:

keeping at a local replica node a local copy of a data set comprising at least one data object, said data set also being replicated at one or more other nodes in the replication enterprise so that changes made locally to said data set by said local replica node are replicated to said one or more other replica nodes;

keeping at said local replica node a chance set comprising a list of changes made to said local copy of said data set either by said local replica node or by said other replica nodes in the enterprise;

examining said local copy of the data set for any expired data objects that are older than a designated time and removing any such expired data objects from said local copy of the data set without broadcasting changes to other replica nodes in the network that would cause the removed expired data objects to be deleted from said other replica nodes; and identifying those changes in said change set that correspond to the expired data objects removed from said local copy and saving information that describes the identified chances in an expired change set which contains a list of all changes corresponding to expired data objects removed from said local copy of the data set.

2. A method for removing expired data objects as recited in claim 1 further comprising the step of storing the largest change from each replica node that has been expired and removed from said local copy of the data set.

3. A method for removing expired data objects as recited in claim 1 wherein the changes made by the local replica node are periodically replicated to said one or more other replica nodes and wherein the method for removing expired data objects further comprises the step of examining any data objects which are older than the designated time and determining if all changes to said objects have been replicated to said one or more other replica nodes and if all changes have not yet been replicated, then retaining said objects until such changes have been replicated to said one or more other replica nodes.

4. A method for removing expired data objects as recited in claim 1 wherein the information that describes which identified changes in said list that correspond to expired data objects removed from said local copy of the data set comprises the largest change which has been expired and deleted from said data set.

5. A method for removing expired data objects as recited in claim 1 wherein said data set comprises a plurality of data objects, some which are allowed to expire and be deleted and some which never expire and wherein the step that examines the local copy of the data set for any data objects older than a designated time will not remove the data objects which never expire.

6. A method for removing expired data objects as recited in claim 1 wherein said data set comprises a plurality of data objects, some which are allowed to expire and be deleted and some which never expire and wherein the step of keeping a change set keeps separate change sets for the data objects which expire and the data objects which do not expire.

7. A method for removing expired data objects as recited in claim 1 further comprising the step of periodically replicating to at least one other replica node a data set comprising all changes which have not expired and been removed from said local node.

8. In a replication enterprise comprising a plurality of replica nodes each of which may make changes to a data object and each of which replicate changes made to the data object to other replica nodes so that changes made to one copy of a data object on one replica node are reflected in other copies of the data object, a method for removing expired data objects that are older than a designated time from one node without removing data objects from the remainder on the nodes and without causing recovery of the removed data objects from other replica nodes, the method comprising the steps of:

keeping at a local replica node a first change set comprising a list of changes, made by said local replica node and at least one other replica node, to a local copy of a data set replicated at said at least one other replica node in the replication enterprise, said data set comprising at least one data object;

examining said local copy of the data set for any expired data objects that are older than a designated time and removing any such expired data objects from said local copy of the data set without broadcasting changes to other replica nodes in the network that would cause the removed expired data objects to be deleted from said other replica nodes; and identifying expired changes in said first change set that correspond to the expired data objects removed from said local copy and saving information that identifies expired changes in an expired chance set which contains a list of all changes corresponding to expired data objects removed from said local copy of the data set.

9. A method for removing expired data objects as recited in claim 8 wherein the step of examining any data objects that are older than a designated time will retain any data objects with changes that have not yet been replicated to said at least one other replica node and will not remove such data objects from said data set until the changes have been replicated to said at least one other replica node.

10. A method for removing expired data objects as recited in claim 9 wherein each change made to said data set is identified by a globally unique change number and wherein the step of saving information that identifies expired changes saves the latest expired change from each replica node.

11. A method for removing expired data objects as recited in claim 10 further comprising the step of periodically broadcasting to said at least one other replica node a second change set comprising all changes which have not expired and been removed from said first change set and excluding expired changes.

12. A method for removing expired data objects as recited in claim 8 wherein said data set comprises a plurality of data objects that are either data objects which can expire and be deleted or data objects which do not expire and are retained so that the data set contains both data objects which will expire and data objects which will not expire.

13. A method for removing expired data objects as recited in claim 12 wherein changes to data objects which can expire and be deleted are stored in the first data set and the chances to data objects which do not expire and are retained are stored in a second data set.

14. A method for removing expired data objects as recited in claim 13 wherein the step of examining said local copy of the data set for any expired data objects only examines and removes data objects which can expire.

15. A method for removing expired data objects as recited in claim 14 further comprising the step of periodically broadcasting to said at least one other replication the second change set comprising changes to data objects which do not expire and a third change set comprising the changes to data objects which can expire but which have not yet expired and been removed.

16. A method for removing expired data objects as recited in claim 15 further comprising the step of testing each data object which can expire and preventing data objects with changes that have not yet been replicated from expiring and being deleted.

17. In a replication enterprise where data objects are replicated among a plurality of computer systems connected together by networking means so that changes made to one copy of a data object on one system are reflected in other copies of the data object on other systems, an article of manufacture for use in one of the computer systems comprising:

program storage means for storing program code means, said program storage means adapted for access by a local computer system so that said program code means can be provided to a CPU of said local computer system, said program code means comprising:

means for storing a local copy of a data set comprising at least one data object, means for storing a list of changes made to said local copy, said list of changes uniquely identifying the changes that have been made to said data set;

means for identifying data objects in said data set that are older than a specified time in order to identify any expired data objects;

means for removing expired data objects from said local copy without replicating the changes to other computer Systems in the network so that said expired data objects are removed only from said local computer system and not from other computer systems in the network; and means for tracking which entries in said list of changes correspond to expired data objects that have been removed from said local copy and which entries in said list correspond to data objects that have not expired so that both expired changes and non-expired changes can be identified.

18. An article of manufacture as recited in claim 17 wherein the program code means further comprises means for removing expired data objects corresponding to expired changes from said local copy of the data set.

19. An article of manufacture as recited in claim 17 wherein the at least one data object is either of a type that does not expire or of a type that does expire.

20. An article of manufacture as recited in claim 19 wherein the means for storing a list of changes comprises:

first storage means for storing a list of changes made to data objects of said data set that are of a type that does not expire; and second storage means for storing a list of changes made to data objects of said data set that are of a type that does expire.

21. An article of manufacture as recited in claim 20 wherein the means for identifying data objects older than a specified time only checks data objects that are of a type that expire.

22. An article of manufacture as recited in claim 21 wherein said means for tracking which entries have expired and which entries have not expired only tracks entries of the list stored in said second storage means.

23. An article of manufacture as recited in claim 17 wherein the program code means further comprises means for tracking which changes have been replicated out to at least one other computer system.

24. An article of manufacture as recited in claim 17 wherein the list of changes comprises changes made by said local computer system and changes made by at least one other computer system.

25. An article of manufacture as recited in claim 24 wherein the list of changes comprises one or more change ranges comprising change numbers which uniquely identify changes made by a particular computer system.

26. An article of manufacture as recited in claim 25 wherein the means for tracking which entries have expired and which entries have not expired comprises the largest expired change number from each computer system.

27. In a replication enterprise where data objects are replicated among a plurality of computer systems connected together by networking means so that changes made to one copy of a data object on one system are reflected in other copies of the data object on other systems, an article of manufacture for use in one of the computer systems comprising:

program storage means for storing program code means, said program storage means adapted for access by a local computer system so that said program code means can be provided to a CPU of said local computer system said program code means comprising:

means for storing changes made by said local computer system or made by at least one other computer system to a data set comprising at least one data object that may be of a type that can expire or that may be of a type that does not expire;

first storage means for storing a list of changes uniquely identifying the changes that have been made to data objects in said data set that do not expire;

second storage means for storing a list of changes uniquely identifying the changes that have been made to data objects in said data set that do expire;

means for identifying expired data objects in said local copy of the data set that older than a specified time and for removing from said local copy of the data set any expired data objects that are older than said specified time; and means for tracking the entries in said list of changes stored in said second storage means that correspond to expired data objects that have been removed from said local copy of the data set.

28. An article of manufacture as recited in claim 27 wherein the list of changes stored in said first storage means and the list of changes stored in said second storage means comprises one or more change ranges comprising change numbers which uniquely identify changes made by a particular computer system.

29. An article of manufacture as recited in claim 28 wherein the means for tracking the entries in the list stored in said second storage means comprises the largest expired change number from each computer system.

* * * * *

UNITED STATES PATENT AND TRADEMARK OFFICE
CERTIFICATE OF CORRECTION

Page 1 of 2

PATENT NO. : 5,794,253
DATED : August 11, 1998
INVENTOR(S): Norin et al.

It is certified that error appears in the above-identified patent and that said Letters Patent is hereby corrected as shown below:

Title, first line, before "EXPIRATION" change "TIME BASED" to --TIME-BASED-- and column 1; before "EXPIRATION" change "TIME BASED" to --TIME-BASED--

Col. 1, line 25, before "resources" change "information" to --informational--

Col. 1, line 48, after "as" delete the comma

Col. 7, line 20, after "comprising" change "programs" to --program--

Col. 19, line 20, before "largest" insert --the--

Col. 22, line 30, after "node" change "B" to --D--

Col. 24, line 24, before "set" change "chance" to --change--

Col. 24, line 38, after "identified" change "chances" to --changes--

Col. 25, line 41, before "set" change "chance" to --change--

Col. 26, line 12, after "other" change "replication" to --replica node--

Col. 26, line 43, after "computer" change "Systems" to --systems--

UNITED STATES PATENT AND TRADEMARK OFFICE
CERTIFICATE OF CORRECTION

PATENT NO. : 5,794,253
DATED : August 11, 1998
INVENTOR(S) : Norin, et. al.

It is certified that error appears in the above-indentified patent and that said Letters Patent is hereby corrected as shown below:

Col. 28, line 1, after "system" insert a comma

Signed and Sealed this

Sixteenth Day of November, 1999

Attest:

Q. TODD DICKINSON

*Attesting Officer*     *Acting Commissioner of Patents and Trademarks*